(12) United States Patent
Catelli et al.

(10) Patent No.: US 9,322,599 B2
(45) Date of Patent: Apr. 26, 2016

(54) CONCENTRATION PLANT WITH DIFFERENTLY WORKING SECTIONS

(75) Inventors: Roberto Catelli, Parma (IT); Stefano Romei, Parma (IT)

(73) Assignee: CFT S.P.A., Parma (IT)

( * ) Notice: Subject to any disclaimer, the term of this patent is extended or adjusted under 35 U.S.C. 154(b) by 715 days.

(21) Appl. No.: 13/704,885

(22) PCT Filed: Jun. 21, 2010

(86) PCT No.: PCT/IT2010/000273
§ 371 (c)(1),
(2), (4) Date: Dec. 17, 2012

(87) PCT Pub. No.: WO2011/161703
PCT Pub. Date: Dec. 29, 2011

(65) Prior Publication Data
US 2013/0092328 A1  Apr. 18, 2013

(51) Int. Cl.
| | |
|---|---|
| *B01D 1/08* | (2006.01) |
| *F28D 9/00* | (2006.01) |
| *B01D 1/06* | (2006.01) |
| *B01D 1/10* | (2006.01) |
| *F28D 7/16* | (2006.01) |

(Continued)

(52) U.S. Cl.
CPC .. *F28D 9/00* (2013.01); *B01D 1/06* (2013.01); *B01D 1/08* (2013.01); *B01D 1/10* (2013.01); *F28D 7/1638* (2013.01); *F28F 1/08* (2013.01); *F28F 9/0202* (2013.01); *F28F 9/0282* (2013.01); *F28D 2021/0042* (2013.01)

(58) Field of Classification Search
CPC .................................... B01D 1/08; B01D 1/10
See application file for complete search history.

(56) References Cited

U.S. PATENT DOCUMENTS

| 2,310,234 A | 2/1943 | Haug |
|---|---|---|
| 3,173,480 A | 3/1965 | Parker |

(Continued)

FOREIGN PATENT DOCUMENTS

| FR | 2561123 A3 * | 9/1985 | ............... B01D 1/10 |
|---|---|---|---|
| JP | 2001027157 A | 1/2001 | |

*Primary Examiner* — Renee E Robinson
*Assistant Examiner* — Jonathan Miller
(74) *Attorney, Agent, or Firm* — Pearne & Gordon LLP

(57) ABSTRACT

Disclosed is a concentration plant with differently-functioning sections. The plant comprises a vertically-developing external tubular sheath (1), internally of which are comprised: a heat exchanger (2), in which a heating fluid coming from a fluid inlet mouth (9) circulates, which heat exchanger (2) is defined by a lower plate (3) and an upper plate (4) on which lower plate (3) and upper plate (4) upper and lower open ends of a first vertically raising tube bundle (5) and a second descending tube bundle (6) are fixed, in which first and second tube bundles (5, 6) the product to be processed circulates; a supply chamber (7), arranged inferiorly of the lower plate (3), which sets an inlet mouth of the product (8) in communication with the lower ends of the tubes of the first tube bundle (5); a pressurised upper chamber (10), arranged superiorly of the upper plate (4), which sets in mutual communication the upper ends of the tubes of the first tube bundle (5) and the second tube bundle (6); a separation chamber (11), which is arranged internally of the sheath (1) and inferiorly of the lower plate (3) and in which the lower ends of the tubes of the second tube bundle (6) open, a product outlet mouth (12) being afforded on a closed bottom of the separation chamber (11), and an outlet opening (13) being afforded on a lateral wall of the separation chamber (11) for exit of steam generated during product concentration.

7 Claims, 3 Drawing Sheets

Figure 1:
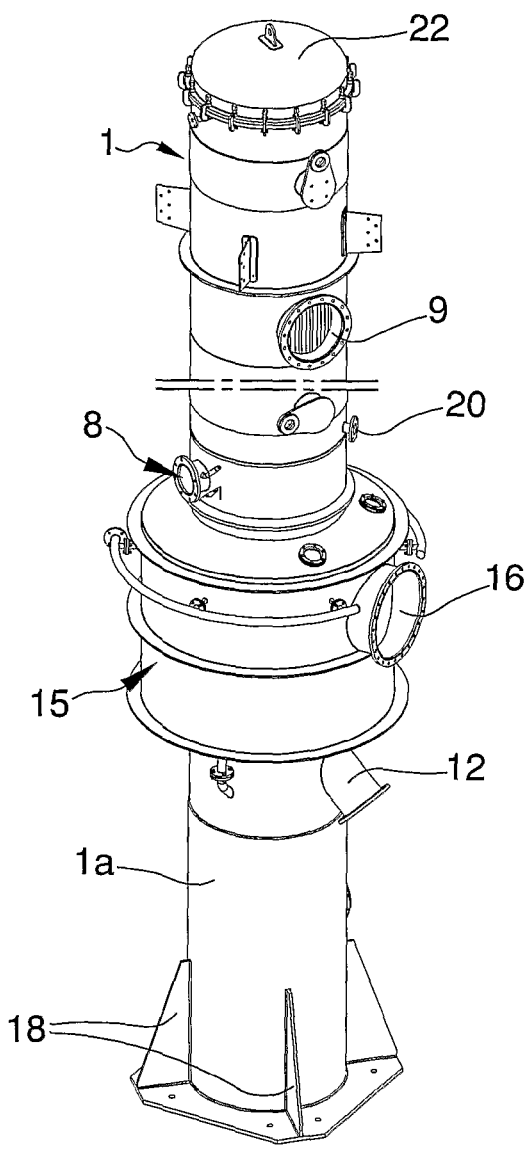

(51) Int. Cl.
    *F28F 9/02*     (2006.01)
    *F28F 1/08*     (2006.01)
    *F28D 21/00*     (2006.01)

(56) References Cited

U.S. PATENT DOCUMENTS

| | | | | |
|---|---|---|---|---|
| 3,820,582 A | * | 6/1974 | Ronnholm | B01D 1/26 159/13.2 |
| 3,997,408 A | * | 12/1976 | Barba | B01D 1/065 159/13.2 |
| 4,206,802 A | | 6/1980 | Reed et al. | |
| 4,810,327 A | * | 3/1989 | Norrmen | B01D 1/065 159/13.3 |
| 5,004,043 A | * | 4/1991 | Mucic | B01D 1/065 159/13.2 |
| 5,246,541 A | * | 9/1993 | Ryham | B01D 1/305 159/13.2 |
| 6,656,327 B2 | * | 12/2003 | Salmisuo | B01D 1/065 122/491 |
| 7,611,604 B2 | * | 11/2009 | Salmisuo | B01D 1/0082 159/13.2 |

* cited by examiner

CONCENTRATION PLANT WITH DIFFERENTLY WORKING SECTIONS

TECHNICAL FIELD

The invention relates to a concentration plant with sections that function differently. The plant is in particular applicable for concentration of juices, purees and consommés of fruit, vegetables and the like.

BACKGROUND ART

In the prior art for concentrating juices, multiple-effect concentration plants are normally used in which concentration is achieved by evaporation.

Multiple-effect concentration plants used for juices and purees of fruit and vegetables are normally realised using different types of functions, in particular forced-circulation evaporators and falling-film evaporators.

In general, each concentration effect avails of a vertical tube bundle in which a plurality of tubes is arranged, ends of which are keyed on two parallel plates, respectively an upper plate and a lower plate, such that the upper ends of the tubes open at an inlet zone of the product while lower ends thereof open into a bottom zone of the evaporator, the separation chamber, in which the product loses water by flash evaporation, and cools; the product is then sent on to further work stations.

The tubes are closed in a sheath, generally cylindrical and delimited by the two parallel plates, internally of which a heating fluid circulates, which is generally steam. The external surface of the tubes is struck by the heating fluid while the internal surface thereof is flowed-through by the product which heats up and loses water in the form of steam, and thus becomes more concentrated.

In forced-circulation evaporators the product completely fills the inside of the tubes, while, in the case of falling-film evaporators, the product forms a thin descending film on the internal part of the tube.

In these plants the tube bundle can be divided into two or more sectors which are arranged in series such that the product which falls from the first sector and reaches the separation chamber is returned to the top of the tube bundle and is made to descend in the subsequent sectors.

The product is then extracted from the separation chamber once it has passed through the final sector. These plants and the functioning thereof are known in the prior art.

The aim of the present invention is to realise a concentration plant which is of simpler construction with respect to the known plants, which is simple to regulate and in which it is possible to obtained various types of functioning in accordance with the viscosity of the products being worked.

An advantage of the invention is that it enables concentrating products having a broad range of viscosity.

A further advantage of the invention is that it reduces the energy consumption required for plant functioning.

These aims and advantages and others besides are all attained by the invention as it is characterised in the following claims.

Figure 5:
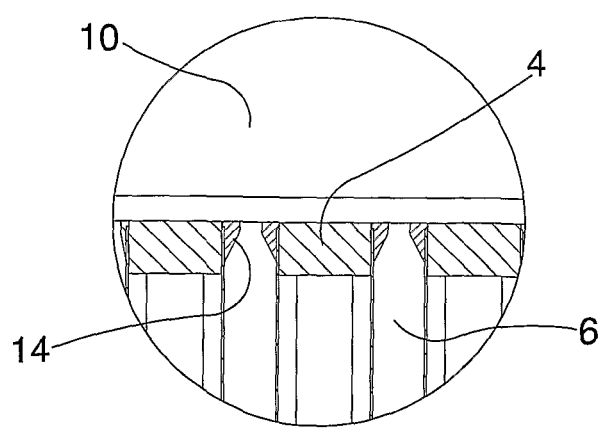
Figure 2:
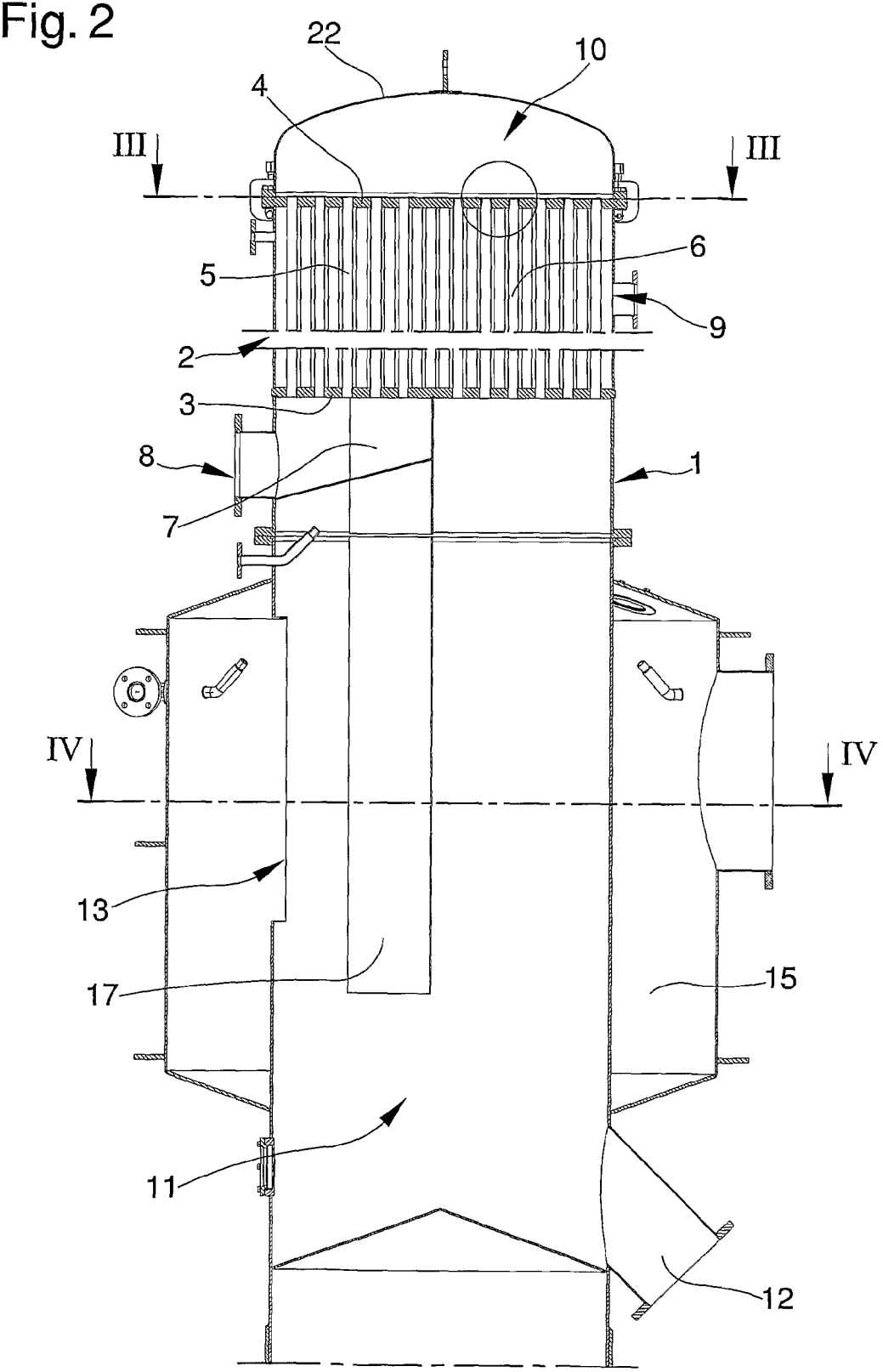
Figure 3:
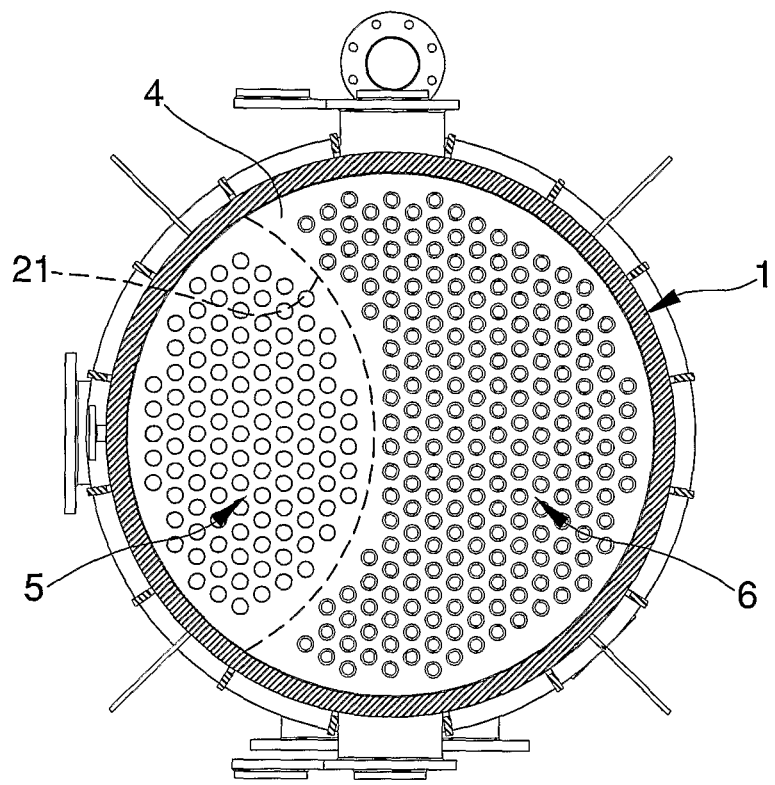
Figure 4:
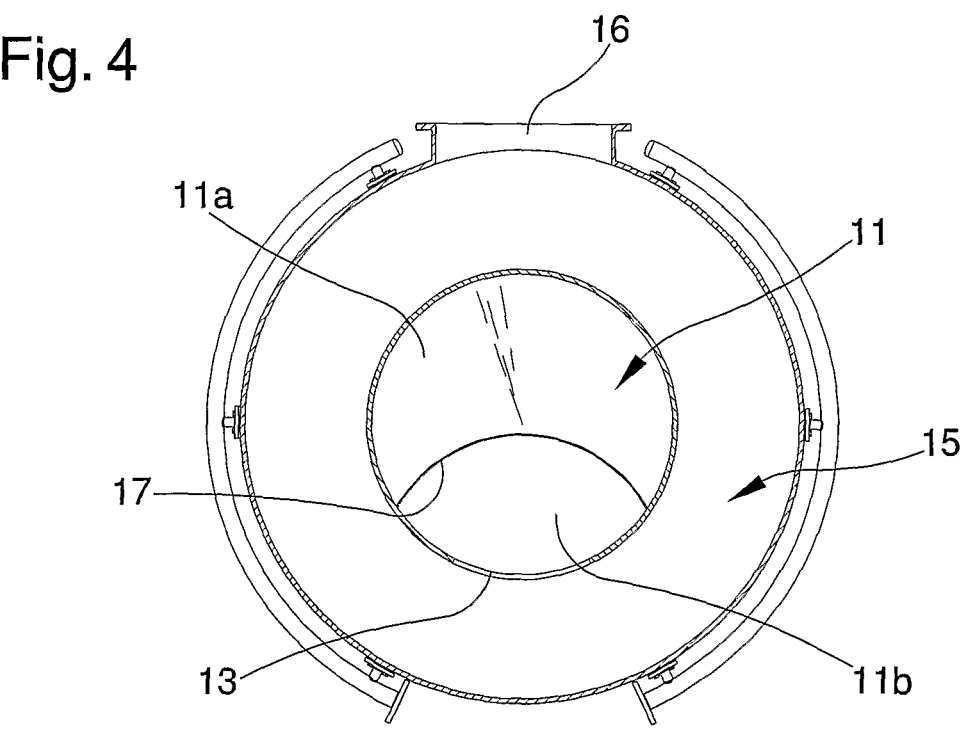

Further characteristics and advantages will more fully emerge from the detailed description that follows of a preferred but not exclusive embodiment of the plant of the invention, illustrated by way of non-limiting example in the accompanying figures of the drawings, in which:

FIG. 1 is a perspective view of the plant of the invention;
FIG. 2 is a vertical-elevation section of the plant of the invention, with some parts removed;
FIG. 3 is a section made along plane III-III of FIG. 2;
FIG. 4 is a section made along plane VI-VI of FIG. 2;
FIG. 5 is a detail in enlarged scale of FIG. 2.

DISCLOSURE OF INVENTION

The plant of the invention comprises an external tubular sheath 1 which is cylindrical in shape and develops in a vertical direction. Internally of the cylindrical sheath there is a heat exchanger 2 which is defined, apart from by the external surface of the sheath 1, by a lower plate 3 and an upper plate 4. Open ends, lower and upper, of a first bundle of vertical rising tubes 5 and a second bundle of vertical descending tubes 6 are fixed by expansion joining and/or welding on the lower 3 and upper 4 plates. The two tube bundles are arranged such that all the tubes of the first and second bundles are close to one another such as to create, internally of the heat exchanger, two distinct sectors, one of which contains the first bundle and the other of which the second bundle. The tubes of both bundles are arranged vertically and parallel to one another.

A heating fluid flows internally of the exchanger, which fluid is generally steam coming from a fluid inlet mouth 9 afforded in the external wall of the sheath 1; as the plant of the invention is also used to realise one of the effects of a multiple-effect plant, the heating fluid can, as happens in known plants, come directly from a steam generator or can come from another effect of multiple-effect plant. An outlet 20 is obviously provided on the bottom of the exchanger for the condensation which is generated internally of the exchanger.

The tubes of the two sectors are all contained internally of the exchanger and are all struck by heating fluid circulating in the heater; the tubes are however separated by an ideal surface which, projected on the plates, defines a separating line 21 which, in the illustrated example, is a curved line. A supply chamber 7 is provided internally of the sheath 1 and inferiorly of the lower plate 3, which chamber 7 sets an inlet mouth 8 of the product, afforded on the external wall of the sheath 1, in communication with the lower ends of the tubes of the first tube bundle 5. The supply chamber 7 is afforded below the sector where the tubes of the first tube bundle 5 are located, and is superiorly delimited on the side of the lower plate on which the lower ends of the tubes of the first tube bundle are joined by expansion and/or welding, and inferiorly by a bottom wall inclined upwards in proximity of the lower end of which the inlet mouth of the product 8 is located, which product is sent to the inlet mouth by a pump of known type and not illustrated. The supply chamber is laterally delimited by the external surface of the sheath 1 and by a shaped lateral wall internally of the sheath 1, which reproduces the progression of the separating line 21, of which more will be mentioned herein below. The inclination of the bottom wall of the chamber 7 prevents product from collecting and stagnating there.

The plant of the invention further comprises a pressurised upper chamber 10 which is arranged superiorly of the upper plate 4 and which places the upper ends of the first bundle of tubes and the second bundle of tubes in communication; the upper chamber is sealedly superiorly closed by a cover 22 which is solidly connected to the upper edge of the sheath 1; the connection between the sheath 1 and the cover is removable such as to enable inspection of the chamber when required, or for normal cleaning operations.

As mentioned above, the upper chamber 10 is pressurised: in order to be able to maintain the product in the chamber under pressure, the sum of the surfaces of the sections of the upper ends of the tubes of the first tube bundle is greater than the sum of the surfaces of the sections of the upper ends of the tubes of the second bundle. In particular, for reasons which will be more fully described herein below, a choke 14 is fashioned in each of the upper ends of the tubes of the second tube bundle, which choke 14 reduces the inlet section of each tube and determines a load loss which is localised in the product passage from the upper chamber 10 to each of the tubes of the second bundle.

A separation chamber 11 is located internally of the sheath 1 and inferiorly of the lower plate 3, the lower ends of the tubes of the second bundle opening into the chamber 11. An outlet mouth 12 for the product is provided on the closed bottom of the separation chamber 11, which bottom has a conical shape with the conical part facing upwards in order to prevent points of product stagnation from forming, the outlet mouth 12 being afforded in proximity of the larger base of the bottom wall.

An outlet opening 13 for the steam generated during product concentration is provided on the lateral wall of the sheath 1 closing the separation chamber. The opening 13 is shaped as a vertical slot and is arranged such as not to interest the bottom terminal zone of the separation chamber. An annular chamber 15 is fashioned externally of the part of the sheath 1 one which the opening 13 is afforded, which chamber 15 is inferiorly and superiorly closed and which sets the opening 13 in communication with an outlet mouth 16 for the vapours generated during product concentration; the outlet mouth 16 is afforded on the external wall of the annular chamber in a position which is diametrically opposite the zone of the annular chamber 15 on which the opening 13 faces. The separation chamber 11 and the annular chamber 15 are maintained under depression by a system, of known type and not illustrated, for aspirating the steam, which is connected to the outlet mouth 16 and which aspirates the steam in the separation chamber 11 and the annular chamber 15.

A separator wall 17 is arranged internally of the separation chamber 11, which separates the chamber into two zones: a descent zone 11a, in which the fluid descends (product and steam) in exit from the tubes of the second tube bundle; a raising zone 11b in which the steam in the separation chamber rises. These two zones are separated from one another and only connected in the lower zone of the separation chamber itself. The separator wall 17 starts from the lower plate and extends vertically towards the bottom of the separation chamber; the wall 17 is fashioned from a metal sheet, the profile of which reproduces the curved separation line 21 to which the sheet is superiorly connected, which is laterally connected, for example by welding, to the internal surface of the sheath 1. The sheet advantageously also defines the shaped lateral wall which, together with a part of the external surface of the sheath 1, laterally closes the supply chamber 7.

A siphon is defined by the separator wall 17 in the separation chamber, which siphon is arranged between the outlet ends of the tubes of the second tube bundle and the outlet opening 13 and which constrains the vapour exiting from the separation chamber to run along the descent zone 11a and the raising zone 11b before exiting from the outlet 13, thus requiring a change of 180° in direction for the exiting steam.

In an advantageous simplification of the construction of the plant, the external tubular sheath 1 extends below the separation chamber 11 and defines a rest base 1a for the plant; rest feet 18 are comprised, solidly connected to the external wall of the part of the sheath 1 which defines the rest base and which broaden the rest base such as to increase the stability of the whole plant.

The flow of the liquids internally of the plant occurs in the following way.

The heating fluid enters the heat exchanger through the inlet mouth 9, heats all the tubes internally of the exchanger, condenses and the condensation exits through the outlet 20.

The product to be treated enters the supply chamber 7 through the mouth 8, rises towards the upper chamber 10 through the tubes of the first tube bundle and from there crosses the tubes of the second tube bundle, descends into the separation chamber 11 and exits from the plant through the mouth 12.

The steam generated in the tubes and the separation chamber following the concentration of the product flow through the descent zone 11a and the raising zone 11b of the separation chamber 11 from which they exit through the outlet opening 13 in order to enter the annular chamber 15. After having run through the annular chamber 15 they exit, aspirated through the mouth 16.

The presence of the wall 17, which obviously is interrupted at a height such as not to interest the bottom of the separation chamber 11 on which the product arrives and is never immersed in the product present on the bottom, prevents the steam from exiting directly through the opening 13, which would lead to the entraining of particles of product by the exiting steam.

According to the characteristics of dynamic viscosity of the fluid, various types of functioning can be performed in the plant, that is:

a) a two-phase exchange regime, with evaporation internally of the tubes, in both the tube bundles and the sections; this occurs for example with low-viscosity clear or turbid juices, with a dynamic viscosity of about from 50 to 500 cP (centiPoise). In this operating regime, the evaporation starts internally of the raising tubes and the relative formation of the steam internally of the tubes generates a re-distribution of the fluid towards the internal walls of the tubes with the consequent formation of a rising turbulent film; in the descending tubes there is evaporation or in any case a flow which does not create a full tube;

b) a single-phase exchange regime (circulation without boiling) in the raising tube bundle and a two-phase heat exchange regime in the descending tubes; this occurs for example for viscous food pastes, with a dynamic viscosity of about from 100 to 1000 cP. With this operating regime there is a full-tube flow (laminar or turbulent mainly according to the viscosity of the product) in the raising tubes; in the descending tubes there is evaporation or in any case a flow which does not create a full tube;

c) a single-phase exchange regime in the raising and descending tubes; this occurs for example for very viscous food pastes with a dynamic viscosity of about from 1000 to 5000 cP. With this operating regime, there is a full-tube flow both in the raising tubes and in the descending tubes, with a possible evaporation internally of the tubes only in the final part of the descending section.

The functioning of the plant of the invention can be modified both in terms of the heat exchange regime in the exchanger and as regards the process of concentration.

The heat exchange regime of the two raising and descending sections essentially depends, apart from on the temperature of the heating fluid, on the flow rate imposed by the circulation pump and the size of the chokes 14, and thus on the overpressure at the mouth of the descending section. The modalities of concentration depend on the ratio between the number of tubes on the raising part and the number of tubes on the descending part, which during the design stage can be varied freely to obtain, for various types of product, various functionings of the plant; in particular, the more the raising tubes diminish with respect to the descending tubes, the more probable it is that a regime of type a) will be used, for low-viscosity fluids, and type b) for average-viscosity fluids (<=1000 CPs).

The plant of the invention is particularly suitable for use as an effect in multiple-effect plants as it is able to process products having variable viscosity over a very wide range. For example, as regards the concentration of fruit purees and tomato juice, typically use is made of three-effect plants. The three concentration effects are normally arranged in counter-current (the boiler steam enters the heat exchanger of the effect from which the concentrated juice exits, while the effects where the product is less concentrated are heated by the steam which have separated from the product in the higher-concentration effects) and are numbered starting from the effect where the boiler steam enters. The first effect is the one in which the boiler steam enters the heat exchanger and in the circuit of which the more concentrated product circulates. The application of the plant of the invention for concentration of the fruit puree and the tomato juice is particularly advantageous. In fact, in the three effects realised with the plant of the object arranged in counter-current, at full operating speed, very different product regimes are established: very viscous pastes in the first effect (100-7000 cP), averagely-viscous semi-concentrated products in the second effect (500-1000 cP), low-viscosity in the third effect (50-500 cPs). In this case the internal geometry of the exchangers will be different in each effect: the ratio between the number of tubes in the raising section and the descending section will be about ¼ for the third effect, about ½ for the second effect, about 1 for the first effect.

The distribution of the tubes and the reciprocal topology of the two tube bundles with raising and descending flow denoted in FIG. 3 is a non-limiting example. There can also be a distribution of a different type, for example with concentric circles in which the raising bundle can be either the internal one or the external annular one.

The plant of the invention provides numerous advantages.

There is a considerable reduction in the power installed on the circulation pumps and heat exchange coefficients obtained are much greater with respect to the technologies traditionally used for these products which comprise the use of forced raised circulating plants (with a full tube) which do not enable the carrying-out of evaporation internally of the tubes.

There is also a reduction in the times of permanence of the product internally of the plant, thanks to the reduction of the circulation circuits and the shape of the separator.

From a constructional point of view the plant dimensions are particularly contained and compact thanks to the fact that the single effects are self-bearing and do not require further metal support structures, and the design of the separator, with the "annular chamber" enables low steam velocity to be obtained internally of the separator without there being any need for an increase in the diameter of the separator.

Then invention claimed is:

1. A concentration plant with differently-functioning sections, characterised in that the plant comprises a vertically-developing external tubular sheath (1), internally of which are comprised:
    a heat exchanger (2), in which a heating fluid coming from a fluid inlet mouth (9) circulates, which heat exchanger (2) is defined by a lower plate (3) and an upper plate (4) on which lower plate (3) and upper plate (4) upper and lower open ends of a first vertically raising tube bundle (5) and a second descending tube bundle (6) are fixed, in which first and second tube bundles (5, 6) the product to be processed circulates, respectively in a rising direction and in a descending direction;
    a supply chamber (7), arranged internally of the sheath (1) and inferiorly of the lower plate (3), an inlet mouth of the product (8) being in communication with the lower ends of the tubes of the first tube bundle (5) by the supply chamber (7);
    a pressurised upper chamber (10), arranged superiorly of the upper plate (4), the upper ends of the tubes of the first tube bundle (5) and the second tube bundle (6) are in mutual communication by the pressurized upper chamber (10);
    a separation chamber (11), which is arranged internally of the sheath (1) and inferiorly of the lower plate (3) and in which the lower ends of the tubes of the second tube bundle (6) open, a product outlet mouth (12) being on a closed bottom of the separation chamber (11), and an outlet opening (13) being on a lateral wall of the separation chamber (11) for exit of steam generated during product concentration;
    the outlet opening (13) being on the lateral wall of the sheath (1);
    an annular chamber (15) being provided, arranged externally, the annular chamber (15) closing at least the part of the sheath (1) on which the opening (13) is realized, which is inferiorly and superiorly closed and which sets the opening (13) in communication with an outlet mouth (16) for steam generated during the concentration of the product, the outlet mouth (16) being on the external wall of the annular chamber in a position which is about diametrically opposite the zone of the annular chamber on which the opening faces (13).

2. The plant of claim 1, characterised in that a sum of surfaces of sections of the upper ends of the tubes of the first tube bundle (5) is greater than a sum of surfaces of sections of the upper ends of the tubes of the second tube bundle (6).

3. The plant of claim 2, characterised in that each of the upper ends of the tubes of the second tube bundle (6) comprises a choke (14), which choke determines a load loss localised in a passage of the product from the upper chamber (10) to each of the tubes of the second tube bundle.

4. The plant of claim 1, characterised in that it comprises a separator wall (17) which is arranged internally of the separation chamber (11) and creates therein two zones, respectively a descending zone (11a) in which the product exiting from the tubes of the second tube bundle descends, and a raising zone (11b) in which the steam present in the separating chamber rises; the two zones being separate from one another and connected only in the lower zone of the separation chamber (11); the separator wall (17) beginning from the lower plate and extending vertically towards a bottom of the separation chamber such as to define a siphon between the outlet ends of the tubes of the second tube bundle and the outlet opening (13).

5. The plant of claim 1, characterised in that the supply chamber (7) comprises a bottom wall, inclined upwards, the inlet mouth (8) for the product being provided in proximity of a lower end thereof.

6. The plant of claim 1, characterised in that the bottom of the separation chamber (11) has a conical shape, with a conical part thereof facing upwards, and in that the outlet mouth (12) for the product is in proximity of the larger base of the bottom wall.

7. The plant of claim 1, characterised in that the external tubular sheath (1) extends below the separation chamber (11)

and defines a rest base (1*a*) for the plant; rest feet (18) being provided, which are solidly connected to the external wall of the rest base (1*a*).

\* \* \* \* \*